(12) United States Patent
Malkan et al.

(10) Patent No.: US 12,379,714 B2
(45) Date of Patent: Aug. 5, 2025

(54) NETWORK MONITORING SYSTEM FOR OPERATIONAL TECHNOLOGY DEVICES

(71) Applicant: Rockwell Automation Technologies, Inc., Mayfield Heights, OH (US)

(72) Inventors: Chirag L. Malkan, Brookfield, WI (US); Yutao Wang, Brookfield, WI (US); Lee A. Lane, Medford, MA (US); Eric A. Norrod, Franklin, NC (US); Jack M. Visoky, Cleveland, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 429 days.

(21) Appl. No.: 17/855,461

(22) Filed: Jun. 30, 2022

(65) Prior Publication Data

US 2024/0004372 A1    Jan. 4, 2024

(51) Int. Cl.
*G05B 19/418* (2006.01)

(52) U.S. Cl.
CPC ..... *G05B 19/4183* (2013.01); *G05B 19/4185* (2013.01)

(58) Field of Classification Search
CPC ............ G05B 19/4183; G05B 19/4185; H04L 63/0227; H04L 63/1408
See application file for complete search history.

(56) References Cited

U.S. PATENT DOCUMENTS

| 2014/0371878 A1* | 12/2014 | Lee .................. H04L 41/022 700/19 |
| 2018/0227369 A1* | 8/2018 | DuCray ................ G16H 40/20 |
| 2020/0021560 A1 | 1/2020 | Hefley et al. |

FOREIGN PATENT DOCUMENTS

CN          113055375 A     6/2021

OTHER PUBLICATIONS

Nyasore, O.N. et al, "Deep Packet Inspection in Industrial Automation Control System to Mitigate Attacks Exploiting Modbus/TCP Vulnerabilities," 2020 IEEE 6th Intl Conference on Big Data Security on Cloud, IEEE Intl Conference on High Performance and Smart Computing, and IEEE Intl Conference on Intelligent Data and Security, May 5, 2020, 5 pages.

(Continued)

*Primary Examiner* — Charles R Kasenge
(74) *Attorney, Agent, or Firm* — Fletcher Yoder, P.C.

(57) ABSTRACT

Embodiments of this present disclosure include an industrial automation system, including an operational technology (OT) industrial automation device. The OT industrial automation device may perform an operation for the industrial automation system. Further, the OT industrial automation device may receive data comprising instructions related to the operation. Embodiments also include a monitoring device to receive the data; identify the OT industrial automation device based on the data; retrieve one or more rules for providing communications to the OT industrial automation device in response to identifying the OT industrial automation device; and selectively forward the data to the OT industrial automation device based on the one or more rules.

17 Claims, 7 Drawing Sheets

(56) References Cited

OTHER PUBLICATIONS

Extended European Search Report for Application No. 23177937.2 mailed Nov. 21, 2023, 11 pages.
Mulder, John et al., "WeaselBoard: Zero-Day Exploit Detection for Programmable Logic Controllers", Sandia Report, Oct. 2013, 28 pages, Sandia National Laboratories Albuquerque, New Mexico and Livermore, California.
Mulder, John et al., "WeaselBoard: A PLC Backplane Analysis System", Nov. 18, 2013, 11 pages, Sandia National Laboratories.

* cited by examiner

NETWORK MONITORING SYSTEM FOR OPERATIONAL TECHNOLOGY DEVICES

BACKGROUND

This disclosure generally relates to systems and methods for monitoring data for operational technology (OT) devices within industrial automation systems. More particularly, embodiments of the present disclosure are directed toward a monitoring system for identifying and blocking receipt of undesirable data by OT devices in industrial automation systems.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light and not as admissions of prior art.

Industrial automation systems may include a wide range of devices, such as overloads, safety relays, circuit breakers, valves, electric motors, controllers (e.g., electric motor controllers), sensors, monitoring devices, or the like, that operate to cooperatively perform a particular function for the industrial automation system. For example, each device may receive data and operate based on the data. In some circumstances, undesirable data may be transmitted to a device of the industrial automation system. For example, a third party may transmit data that causes undesirable operation of the device, interferes with communication associated with the device, and impacts overall operation of the industrial automation system. Thus, it is presently recognized that limiting access to certain types of data at the device may improve operation of the industrial automation system.

SUMMARY

A summary of certain embodiments disclosed herein is set forth below. It should be understood that these aspects are presented merely to provide the reader with a brief summary of these certain embodiments and that these aspects are not intended to limit the scope of this present disclosure. Indeed, this present disclosure may encompass a variety of aspects that may not be set forth below.

In one embodiment, an industrial automation system, including an operational technology (OT) industrial automation device may perform an operation for the industrial automation system. Further, the OT industrial automation device may receive a first set of data comprising a first set of instructions related to the operation. The embodiment may also include a monitoring device to receive the first set of data; identify the OT industrial automation device based on the first set of data; retrieve one or more rules for providing communications to the OT industrial automation device in response to identifying the OT industrial automation device; and selectively forward the first set of data to the OT industrial automation device based on the one or more rules.

In another embodiment, non-transitory, computer-readable medium may include instructions that, when executed by one or more processors, may perform an operation including receiving a first set of data comprising one or more instructions related to a first operation for an operational technology (OT) industrial automation device. The one or more processors may also: identify the OT industrial automation device based on the first set of data; retrieve one or more rules for providing communications to the OT industrial automation device in response to identifying the OT industrial automation device; and selectively forwarding the first set of data to the OT industrial automation device based on the one or more rules.

In yet another embodiment, a monitoring device of an industrial communication subsystem of an industrial automation system may perform a method including receiving a data packet addressed to an OT industrial automation device of the industrial automation system; determining that the OT industrial automation device that corresponds to the data packet corresponds to one of a plurality of OT industrial automation devices; in response to determining that the OT industrial automation device corresponds to the one of the plurality of OT industrial automation devices, determining a rule associated with providing data to the one of the plurality of OT industrial automation devices; and selectively forwarding the data packet to the OT industrial automation device based on the rule.

BRIEF DESCRIPTION OF THE DRAWINGS

These and other features, aspects, and advantages of the present disclosure may become better understood when the following detailed description is read with reference to the accompanying drawings in which like characters represent like parts throughout the drawings, wherein.

DETAILED DESCRIPTION

Figure 1:
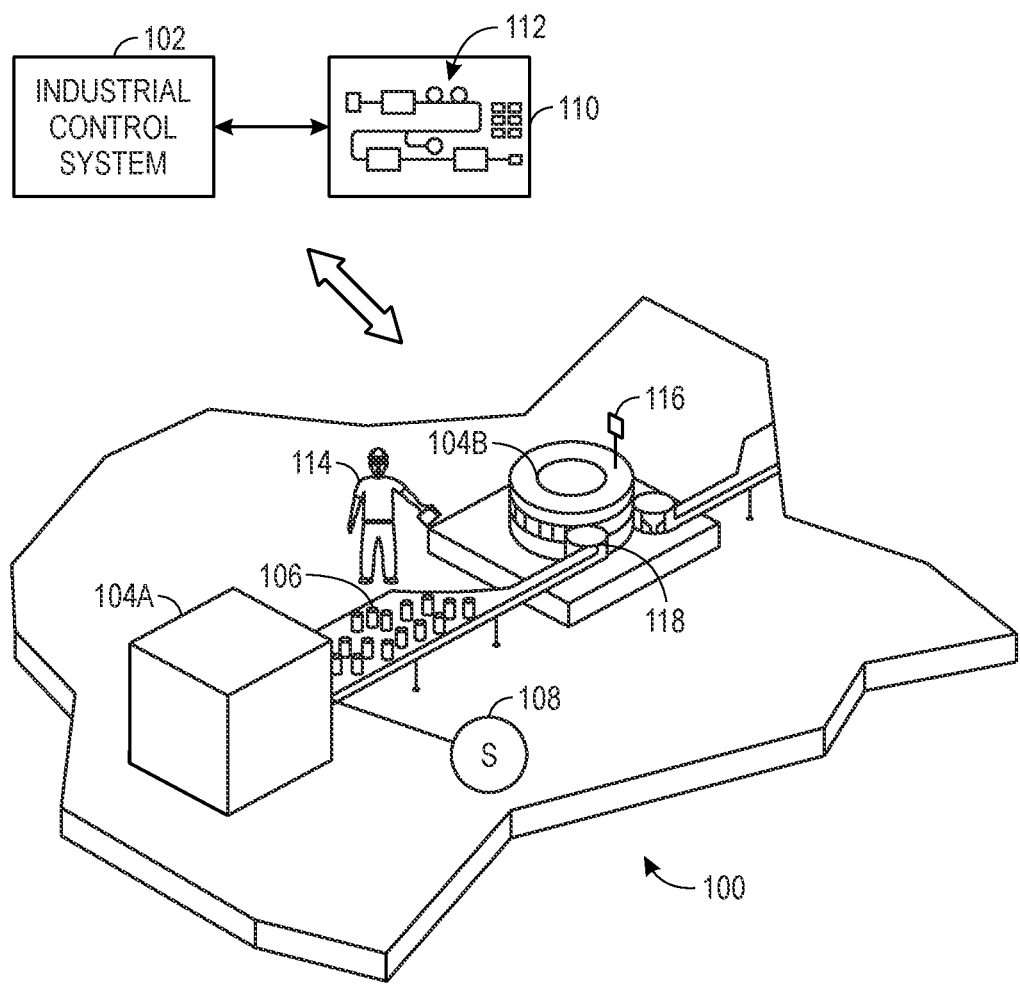
FIG. 1 is a perspective view of an example industrial automation system, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions are made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Industrial automation systems may be used in various contexts, such as a manufacturing plant, a resource extraction system, a hydrocarbon extraction site, a chemical refinery facility, an industrial plant, a power generation system, a mining system, a brewery, or the like. An industrial automation system may include a variety of devices that operate to enable the industrial automation system to perform a particular function. For example, for an industrial automation system associated with resource extraction, a control system may operate a drive to control load and position of a rod pump to enable the industrial automation system to perform an oil extraction process. Although examples are provided with regard to specific contexts, one of ordinary skill in the art will recognize that these examples are not intended to be limiting and that the techniques described herein can be used with any suitable context.

An industrial automation systems may employ information technology (IT) and operational technology (OT) devices to perform operations. IT devices may include any suitable hardware and/or software device, such as a server, a database, a website, and so forth, that processes, manages, or controls data related to an industrial automation system, and the OT devices may include any suitable hardware and/or software device, such as a programmable controller, a push button, a light emitter, a switch, a contactor, and so forth, that directly controls operation of a physical component (e.g., a robot) of an industrial automation system. An OT device may operate based on received data, such as data transmitted from another device of the industrial automation system (e.g., data initially processed by an IT device, data transmitted by another OT device).

Unfortunately, undesirable data may be transmitted to an OT device. As an example, a third party may cause the undesirable data to be transmitted to the OT device to change, suspend, or otherwise impact operation of a physical component controlled by the OT device. For instance, the OT device may be connected to a network or other communication subsystem (e.g., a subnetwork or subnet), and the third party may utilize the network to transmit the undesirable data to the OT device. Receipt of the undesirable data by the OT device may cause the OT device to operate a physical component of the industrial automation system in an undesirable manner, such as to reduce effective or efficient overall operation of the industrial automation system.

As such, it is presently recognized that blocking or mitigating receipt of undesirable data by an OT device may improve operation of the industrial automation system. Thus, embodiments of the present disclosure are directed to a monitoring device designed to monitor data communication associated with OT devices. For example, the monitoring device may connect to a gateway or other component in a network. The monitoring device may monitor data communications along channels of communication to OT devices in the network and determine whether the data transmitted to and/or from the OT devices are desirable or expected. In some embodiments, the monitoring device may monitor a specific type of OT device. For example, the monitoring device may be programmed to monitor data communication specifically associated with push buttons. For instance, each push button of a subsystem of an industrial automation system may be expected to receive specific signals (e.g., instructions to enable or disable operation of the button), and the monitoring device may confirm that the signals received by the push buttons match with the expected signals. The monitoring device may additionally be programmed to monitor a group of OT devices. For example, each OT device of the group of OT devices may be expected to communicate a common or shared type of data, and the monitoring device may confirm that data being communicated between the group of OT devices are of the expected, common type.

To this end, the monitoring device may include a set of rules that indicate expected and/or unexpected data communications and determine whether data communication associated with an OT device is expected or unexpected based on the set of rules. For example, the monitoring device may identify an associated OT device or type of OT device that the monitoring device may monitor, such as based on data being transmitted to the OT device, and the monitoring device may retrieve or select a rule from the set of rules based on the OT device. Additionally, the monitoring device may apply machine learning techniques to generate or adjust a set of rules that indicate expected and/or unexpected data communications. For example, the monitoring device may determine whether certain data received by the OT device causes undesirable operation of the OT device. In response to determining that the data causes undesirable operation of the OT device, the monitoring device may adjust or update a set of rules to block receipt of such data that may be subsequently transmitted toward the OT device. Thus, the monitoring device may use machine learning to improve the effectiveness of existing rules by monitoring the downstream effects of allowing/blocking certain communications to the OT devices.

The monitoring device may perform intrusion detection system (IDS) functionalities, which may include determining receipt of undesirable data by an OT device, and/or intrusion prevention system (IPS) functionalities, which may include blocking receipt of undesirable data by an OT device. Indeed, the monitoring device may perform any suitable mitigating action to block unexpected data communication from affecting operation of the industrial automation system. For example, in response to identifying unexpected data communication associated with an OT device, the monitoring device may flag the communication as an unexpected communication, store a log of the flagged communication, send a notification, deny communication access to the OT device, suspend operation of the OT device, suspend a communication channel used for communication with the OT device, and the like. Thus, operation of the monitoring device may enable more desirable operation of the industrial automation system, such as more suitable functionalities (e.g., implementation of appropriate operating modes), more efficient operations (e.g., energy consumption), improved safety capabilities (e.g., operations that are more readily adjustable), and the like.

It should be noted that the monitoring device may be dedicated to monitoring data communications specifically associated with OT devices. Thus, the monitoring device may more readily control data communication associated with the OT devices, such as in comparison with a device that may generally monitor data communication within a network of an industrial automation system, such as for both IT devices and OT devices. Indeed, OT devices may communicate specific data for a particular industrial automation system (e.g., to operate a component specifically associated with the particular industrial automation system) such that different industrial automation systems may include different OT devices that enable specific operations of certain components. The monitoring device may be tailored to monitor the specific data communicated by an OT device or group of OT devices for an industrial automation system. As such, the monitoring device may more readily block (e.g., with reduced latency) undesirable data communication associated with an OT device. Additionally, communication between OT devices of the industrial automation system may have certain properties (e.g., cyclic properties, deterministic properties) that the monitoring device may utilize to determine whether undesirable data is being received. Furthermore, a cost and/or difficulty associated with implementing the monitoring device may be reduced. By way of example, the monitoring device may be dedicated to monitor data communication associated with a particular set of OT devices, and operation and/or configurability of the monitoring device to monitor data communication associated with other OT devices and/or IT devices may be avoided. In this manner, the monitoring device may be more easily implemented to enable desirable operation of industrial automation systems.

By way of introduction, FIG. 1 is a perspective view of an example industrial automation system 100. The industrial automation system 100 may be controlled by an industrial control system 102. In addition, the industrial automation system 100 may include one or more stations having components and/or machines to conduct a particular function within an automated process, such as of an automated assembly line. The example automated process of the industrial automation system 100 may begin at a station 104A used for loading objects, such as empty cans or bottles to be filled, into the industrial automation system 100 via a conveyor section 106. The conveyor section 106 may transport the objects to a station 104B to perform a first action, for example, washing the empty cans and/or bottles. As objects exit from the station 104B, the conveyor section 106 may transport the objects to subsequent stations 104 to continue the manufacturing or assembly process. It should be understood, however, that for other applications, the particular system, machine components, machines, stations, and/or conveyors may be different or specially adapted to the application. In addition to the equipment described above, the industrial automation system 100 may also include motors, protection devices, switchgear, compressors, and the like.

One or more properties of components of the industrial automation system 100 may be monitored and controlled by an industrial control system 102 for regulating control variables. For example, sensing devices (e.g., sensors 108) may monitor various properties of the industrial automation system 100 and generate outputs used during operation of the industrial automation system 100. Scanners, gauges, valves, flow meters, and the like may each generate sensing data during operation of the industrial automation system 100. Sensing data may include digital or analog values representative of a sensed voltage, current, pressure, moisture level, audio level, containment level, or any other suitable parameter associated with an operation of the industrial automation system 100. The sensing data may be of any suitable format, and thus may include one or more analog electrical signals, digital data signals, pulse-width-modulated data signals, or the like. Furthermore, the input/outputs between the industrial control system 102 and the sensors 108 may be communicated using a protocol. For example, an Industrial Protocol over an Ethernet cable or other communication link may be used.

The sensing data is used by the industrial control system 102 to monitor the industrial automation system 100 and determine operational adjustments to the industrial automation system 100. These adjustments may be managed via control loops communicatively coupled to one or more sensors 108 and/or one or more industrial automation components (e.g., actuators, heating elements, etc.) via transmission lines. For example, a control loop may include a control system coupled to a motor drive, where the control system may adjust operations of the motor drive based on sensing data received from the one or more sensors 108. The industrial control system 102 may be communicatively coupled to a display/operator interface 110 (e.g., a human/machine interface (HMI)) and to one or more devices of the industrial automation system 100. The industrial control system 102 may represent components of the industrial automation system 100 through visualizations 112 of the components on the display/operator interface 110.

The sensors 108 may be any device adapted to provide information regarding process conditions. An operator 114 monitoring the industrial automation system 100 may reference the display/operator interface 110 to determine various statuses, states, and/or current operations or when adjusting operations of the industrial automation system 100 and/or for a particular component.

The industrial control system 102 may use networked devices 116 in managing operation of the industrial control system 102. The networked devices 116 may be any suitable device within the industrial automation system 100 that communicates a status, a data packet, an alert, or the like, to the industrial control system 102 and/or to other networked devices 116. The networked devices 116 may each include processing circuitry coupled to a sensor 108 that enables transmission of sensing data (e.g., sensed data) to the industrial control system 102. Further, in some embodiments, the networked devices 116 may have internet protocol (IP) addresses.

The networked devices 116 may include OT industrial automation devices, such as controllers (e.g., the industrial control system 102), buttons, sensors (e.g., the sensor 108), light emitters (e.g., a light emitting diode), switches, etc., that may directly control operation of an industrial automation device 118 of the industrial automation system 100. For instance, the industrial automation device 118 may include a motor that operates (e.g., rotates) the conveyor section to transport objects. As an example, an OT device may receive data and operate the component based on the data. As another example, the OT device may transmit data (e.g., to another OT device) based on operation of the component and, for instance, cause operation of another component. Thus, data communication associated with the OT device may affect overall operation of the industrial automation system 100. Accordingly, the networked devices 116, and any other IT or OT device in the industrial automation system 100, may be part of a protected zone of devices that block undesirable data communication from reducing effective or efficient operation of the industrial automation system 100.

Figure 2:
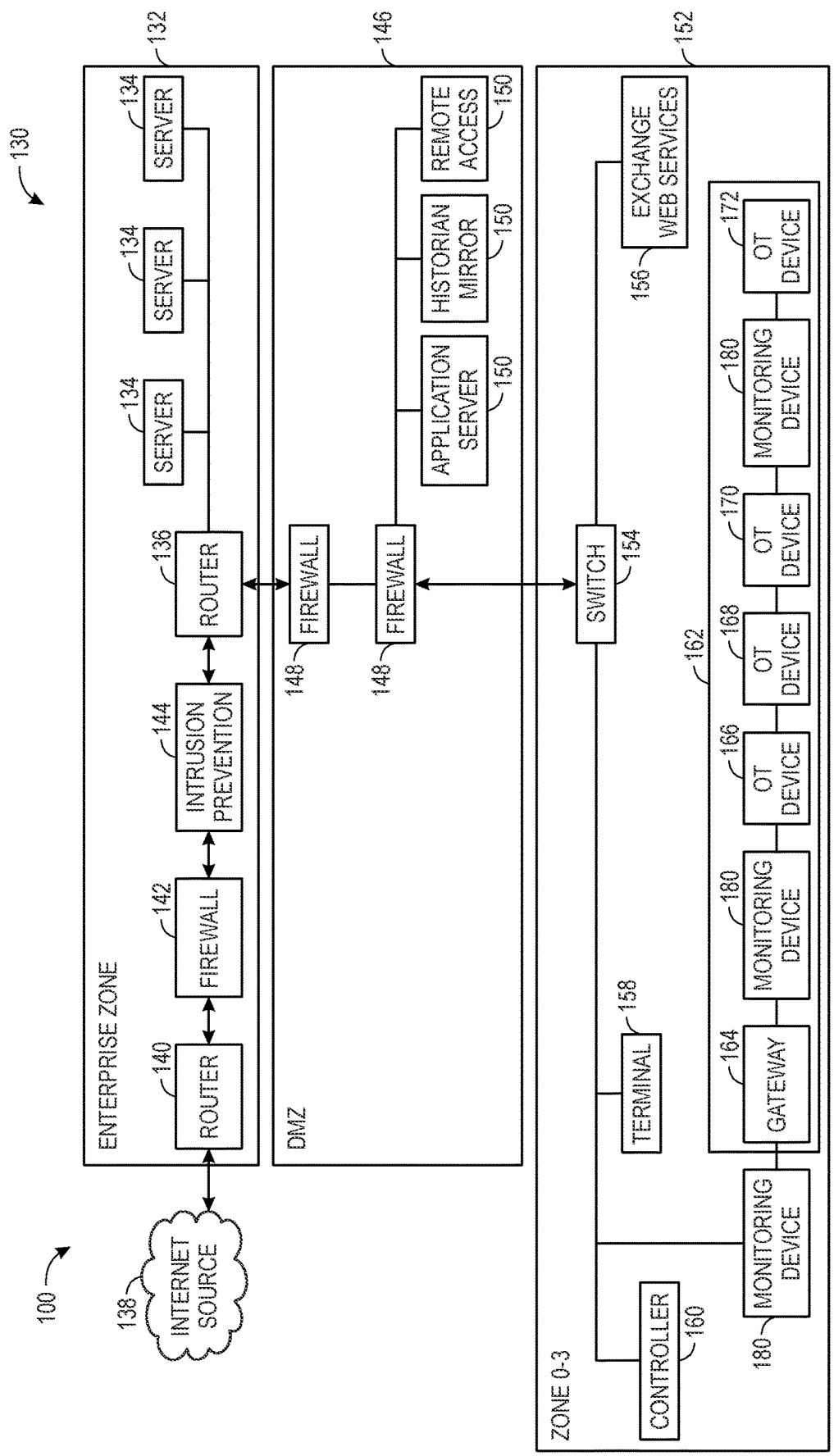
FIG. 2 is a diagram of different zones of information technology (IT) and operational technology (OT) devices and security measures of the industrial automation system of FIG. 1, in accordance with an embodiment.

FIG. 2 illustrates a diagram 130 of the industrial automation system 100 (e.g., of an enterprise having an internal network system) that includes different zones and devices arranged in the zones. For example, the devices may be arranged in three logical grouping in a networking roadmap: group 132, group 146, and group 152. The group 132 may interface with external sources of data (e.g., data sources external to the internal network system of the enterprise). In the illustrated embodiment, the group 132 includes a number of servers 134. For example, the servers 134 may be internet servers, email servers, database servers, or any other type of server that may transmit data within the group 132 (e.g., from external data sources). A first router 136 may receive the data communications from the servers 134. Additionally, an internet source 138, which may be external to the industrial automation system 100, may send data communications to a second router 140. The second router 140 may route the data from the internet source 138 to a firewall 142, from the firewall 142, or both. The firewall 142 may send and receive data communications (for example, from the internet source 138) to and/or from a security device 144. The security device 144 may be an IDS, an IPS, or may have both detection and protection functionality. The security device 144 may selectively communicate secure data communications to the first router 136 to be routed to the group 146.

The group 146 may be a demilitarized zone (DMZ) to provide an interface between certain (e.g., sensitive) networks of the industrial automation system 100 and the group 132, along with its associated internet source 138 and/or servers 134. According, a number of firewalls 148 of the group 146 may receive and filter the data communications from the first router 136 to remove unauthorized communications from proceeding beyond the firewalls 148. The firewalls 148 may send filtered communication signals to/from servers 150 of the group 146. The servers 150 may include an application server, a historian mirror server, a remote access server, or any other server to perform operations of the industrial automation system 100.

The firewalls 148 may also enable data communications to and/or from the group 152. For example, the firewalls 148 may be communicatively connected to a switch 154 of the group 152. The switch 154 may route the data from the firewalls 148 to various locations within the group 152. For example, the switch 154 may route the data to and/or from a server 156. In some embodiments, the server 156 may be an exchange web services (EWS) application programming interface (API) to provide connectivity to Exchange Online items, such as email messages, web meetings, etc. Further, the server 156 may be any similar API to provide connectivity to a number of web services with which the industrial automation system 100 may be in communication.

Moreover, the switch 154 may route the data to a terminal 158 (e.g., a display interface) and/or a controller 160 of the group 152. The terminal 158 may present various information related to operation of the group 152, such as a status of a device of the group 152. The controller 160 (e.g., the industrial control system 102) may control operations of various devices within the group 152, such as of the terminal display 158. The data may also be directed from the switch 154 to an industrial communication subsystem 162 (e.g., a subnetwork, an in-cabinet communication subsystem, an on-machine subsystem). In certain embodiments, the industrial communication subsystem 162 may include any number of devices, such as OT devices, of the industrial automation system 100. For example, the industrial communication subsystem 162 may include a gateway or bridge 164 and OT devices 166, 168, 170, and 172. The OT devices 166, 168, 170, and 170 may include, for example, a button (e.g., a push button), a controller, a thermostat, an LED light, a safety input device, or other type of OT device. The gateway 164 may direct data communications received from the switch 152 to the OT devices 166, 168, 170, and 172 and/or send network traffic of the group 152 to the switch 154 (e.g., for transmission to devices outside of the group 152). The described OT devices are intended to be illustrative only, and it should be noted that any number, and any type, of OT devices may be present on the industrial communication subsystem 162, or on any other network or industrial communication subsystem of the group 152. Such OT devices may be arranged in-cabinet (e.g., within a cabinet subsystem), on-machine (e.g., on a machine subsystem), or in any other suitable manner.

In some embodiments, the group 152 (e.g., the switch 154, the gateway 164) may lack security measures to identify and block security threats to the controller 160 and/or the OT devices on the industrial communication subsystem 162. It may be desirable to block or prevent receipt of undesirable or unexpected data by the OT devices on the industrial communication subsystem 162, as well as at any other part of the industrial automation system 100, to enable effective and/or efficient operation of the industrial automation system 100. For example, in some embodiments, undesirable or unexpected data may be any data that is incompatible with the OT device. For example, the data may be incompatible because the OT devices may not be designed to perform operations of the undesirable data, it may not be desirable for the OT devices to perform operations related to the undesirable data, among other things. However, the security device 144 may be particularly designed to monitor data communication associated with IT devices, such as the routers 136, 140, the servers 134, 150, and/or the firewalls 142, 148. Indeed, the security device 144 may be designed to service, process, or otherwise handle relatively large amounts of data, and it may be difficult, costly, and/or impractical for the security device 144 to monitor additional data communication associated with OT devices.

Rather, a smaller, programmable security device may be more suitable to monitor data communications associated with OT devices, which may be associated with relatively smaller scales of operations and/or more specific functionalities (e.g., amounts of data communication). Accordingly, in some embodiments, a monitoring device 180 may be utilized to provide security specifically for OT devices. In the illustrated example of FIG. 2, a number of monitoring devices 180 may be utilized. For example, one of the monitoring devices 180 may be positioned outside of the industrial communication subsystem 162 and may be communicatively connected to the gateway 164. Further, other monitoring devices 180 may be dispersed throughout the industrial communication subsystem 162, as illustrated. It should be noted that the monitoring device 180 may provide security measures for OT devices in any location. Indeed, the monitoring device 180 may monitor communication traffic along any channel of communication, such as within a server, on a network, on an Ethernet connection (e.g., a twisted Ethernet cable), on the internet, or on any other data communication channel. For instance, the monitoring device 180 may monitor communications received by the group 152 (e.g., data transmitted by the group 132 and/or the group 146) and/or communications originating from the group 152 (e.g., data being transmitted between OT devices within the group 152, data being transmitted to an OT device outside of the group 152). Operations performed by the monitoring device 180 may include receiving data and selectively forwarding data to the OT device, polling or inspecting data already received by the OT device and performing an action to block effects of the received data, intercepting data that may not initially be directed for transmission to the monitoring device 180 and selectively forwarding the data to the OT device, or any other suitable monitoring operations and/or operations to block undesirable effects of the data communications. The monitoring device 180 may be implemented anywhere to monitor network traffic on a physical layer, a data link layer, or a network layer (i.e., layers 1-3) of the open systems interconnection (OSI) model, which describes layers that computer systems may use to communicate via a network.

The monitoring device 180 may be intended to provide additional security measures. For example, the monitoring device 180 may operate independently with respect to the security device 144 to monitor data communication between the OT devices. Additionally, in some embodiments, there may be security measures or operations performed within a device itself (e.g., a server or a database), such as a host-based intrusion detection system (HIDS), and the monitoring devices 180 may provide additional monitoring of data with respect to HIDS techniques. Indeed, implementation of the monitoring device 180, which may be separate from or external to the OT devices and other components of the industrial automation system 100, may be more practical and/or cost-efficient in comparison with integrating HIDS into already existing OT devices to monitor data communications. In any case, the monitoring device 180 may be implemented as a virtual module and/or via hardware.

Figure 3:
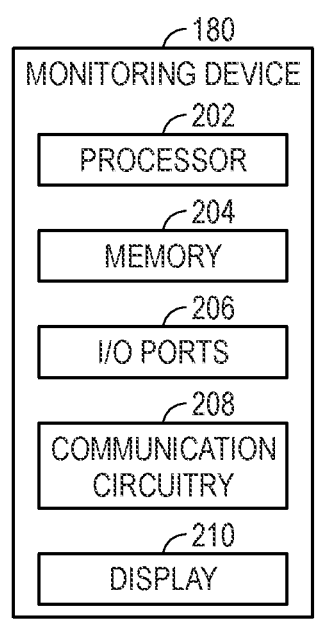
FIG. 3 is a block diagram of a monitoring device of the industrial automation system of FIG. 1, in accordance with an embodiment.

Turning now to a more detailed discussion of the monitoring device 180, FIG. 3 illustrates a block diagram of components of the monitoring device 180. For example, the monitoring device 180 may include a processor 202, a memory 204, input/output (I/O) ports 206, communication circuitry 208, a display 210, and the like. The processor 202 may be any type of computer processor or microprocessor capable of executing computer-executable code. The processor 202 may also include multiple processors that may perform the operations described below. The memory 204 may be any suitable articles of manufacture that can serve as media to store processor-executable code, data, or the like. These articles of manufacture may represent non-transitory computer-readable media (e.g., any suitable form of memory or storage) that may store the processor-executable code used by the processor 202 to perform the presently disclosed techniques. Generally, the processor 202 may execute software applications that include monitoring and operating based on data communications associated with OT devices, as discussed in more detail herein.

The memory 204 may also be used to store data for the monitoring device 180. For example, the memory 204 may store instructions that provide rules of operation for the monitoring device 180. For example, the memory 204 may store information including rules for identifying potential undesirable data transmitted toward OT devices, as well as other information. Further, the memory 204 may store a log of identified threats to one or more OT devices monitored by the monitoring device 180.

The I/O ports 206 may be interfaces that may couple to other peripheral components, such as input devices (e.g., keyboard, mouse), sensors, input/output (I/O) modules, connectors (e.g., a wire, an industrial communication subsystem ribbon cable), and the like. The I/O ports may enable the monitoring device 180 to communicate with the gateway 164, the OT devices 166, 168, 170, and 172, as well as other devices in the industrial automation system 100. Further, the I/O ports 206 may communicatively connect with the communication circuitry 208. The communication circuitry 208 may facilitate communication between the monitoring device 180 and other communication capable devices of the industrial automation system 100. For example, the communication circuitry 208 may include blue-tooth, Wi-Fi, hardware communication bus technology, or other wired or wireless communication circuitries.

The display 210 may depict visualizations associated with software or executable code being processed by the processor 202. In one embodiment, the display 210 may be a touch display capable of receiving inputs from a user of the monitoring device 180, such as an indication indicating that the monitoring device 180 should monitor the OT devices based on a different set of rules. As such, the display 210 may serve as a user interface to communicate with monitoring device 180. The display 210 may display a graphical user interface (GUI) for operating the monitoring device 180. The display 210 may be any suitable type of display, such as a liquid crystal display (LCD), plasma display, or an organic light emitting diode (OLED) display, for example. Additionally, in some embodiments, the display 210 may be provided in conjunction with a touch-sensitive mechanism (e.g., a touch screen) that may function as part of a control interface for the monitoring device 180.

It should be noted that the listed components are provided as example components, and the embodiments of the monitoring device 180 described herein are not to be limited to the components described with reference to FIG. 3. Further, it should be noted that although physical circuitry has been used to describe the components of the monitoring device 180, in some embodiments, the monitoring device 180 may be a virtual module. Accordingly, software and other virtual methods may be used to achieve the functional equivalency of the components of the monitoring device 180.

Figure 4:
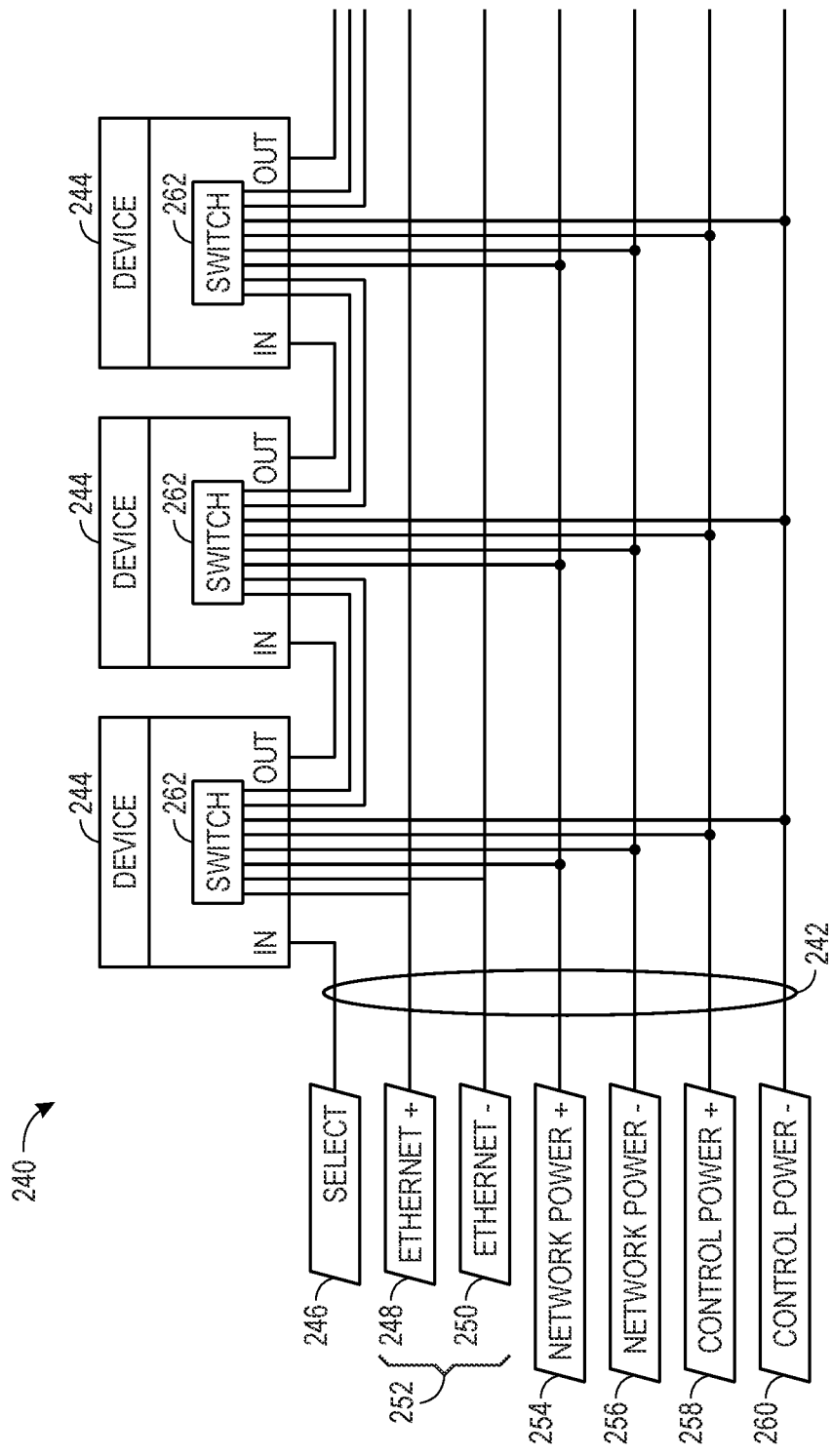
FIG. 4 is a diagram of an example industrial communication subsystem ribbon cable used to connect components of the industrial automation system of FIG. 1, in accordance with an embodiment.

As monitoring devices 180 have been described as optionally operating on an industrial communication subsystem, such as the industrial communication subsystem 162, it may be beneficial to describe an industrial communication subsystem in detail. Accordingly, FIG. 4 illustrates one example of an industrial communication subsystem 240, which, in some embodiments, may be the industrial communication subsystem 162. As used herein, the industrial communication subsystem ribbon cable 242 may include a series of single conductor wires placed parallel to each other and molded together. The industrial communication subsystem ribbon cable 242 may receive and transmit data between devices 244. An industrial communication subsystem (e.g., Ethernet/IP) is a portion of the communication network logically designated for transmitting messages between devices 244. In some embodiments, the devices 244 may include a drive, an internal I/O device, an external I/O device, the monitoring device 180, or any other device (e.g., OT device) of the industrial automation system 100.

Each device 244 may be communicatively coupled to other components of the industrial automation system 100 outside of the industrial communication subsystem 240 via a communication network (e.g., Ethernet network) and/or industrial communication subsystems of the communication network. Keeping this in mind, in some embodiments, the industrial communication subsystem ribbon cable 242 may include a select signal 246, an Ethernet positive signal 248 and negative signal 250 (e.g., the single pair Ethernet (SPE) conductors 252), network power positive signal 254 and negative signal 256, and a control power positive signal 258 and negative signal 260. The select signal 246 may serve to select or access additional devices 244 connected to a gateway communication device, such as the gateway 164.

For example, the gateway 164 may send a select signal 246 to one of the device 244 to identify the device 244, provide an IP address for the device 244, or the like. That is, when the select signal 246 is provided to a particular device 244, the particular device 244 may be assigned an IP address that serves as identification for the particular device 244. The gateway 164 may identify each device 244 and respective data properties for scanning purposes.

Referring again to the industrial communication subsystem ribbon cable 242, the Ethernet positive signal 248 and negative signal 250 (e.g., the SPE conductors 252) may provide network communication functionality using an SPE protocol. In some embodiments, the Ethernet positive signal 248 and negative signal 250 may be a part of a bus system. The network power positive signal 254 and negative signal 256 may deliver power to network components of each of the devices 244 and components from a power supply or tapped connection off another electrical coupling. The control power positive signal 258 and negative signal 260 may power an actuator (e.g., a contactor coil) or other control mechanism for at least one of the devices 244. An actuator may execute a control operation for the device 244. For example, a control operation of the device 244 may include flipping a switch to electrically couple a motor to a power source, the device 244, or the like.

It can be appreciated that any suitable number of pins and lines may be used to form the industrial communication subsystem ribbon cable 242 (e.g., five-line ribbon cable, seven-line ribbon cable). As illustrated in FIG. 4, the industrial communication subsystem ribbon cable 242 may be a six-line cable that uses eight-pin connector circuitry to couple the devices 244 to the communication network (e.g., Ethernet network) and each other.

In some embodiments, one or more of the devices 244 may be connected to the industrial communication subsystem ribbon cable 242 (e.g., having the SPE conductors 252) via respective vampire taps. Further, Ethernet signals may transmit through respective switches 262 of the devices 244 that may control a timing used to transmit messages between the devices 244 or between the devices 244 and components of the industrial automation system 100 via Ethernet communicative couplings. Further, it should be appreciated that although the industrial communication 240 illustrates an embodiment that may connect the monitoring device 180 to OT devices, such as the devices 244, the monitoring device 180 is not limited to an industrial communication subsystem. Indeed, the monitoring device 180 may be applied to monitor OT devices on any channel of data communication.

Figure 5:
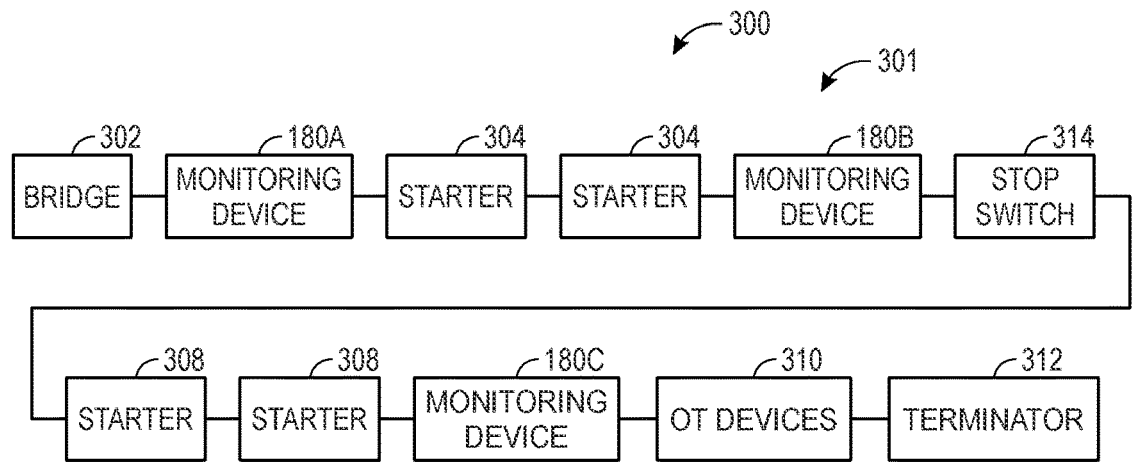
FIG. 5 is a diagram of a system employing the monitoring device of FIG. 3, in accordance with an embodiment.

Keeping the following in mind, operations of the monitoring device 180 are described in FIG. 5. FIG. 5 includes a diagram 300 of a system 301 (e.g., an industrial communication subsystem of the industrial automation system 100), which includes an example assembly of devices that may be communicatively coupled to one another, such as via the industrial communication subsystem ribbon cable 242. Indeed, control of the devices of the system 301 may be coordinated as a network. For example, in some embodiments, a bridge 302 may route data communications from another component (e.g., the controller 160) external to the system 301 into the system 301, and the data may be distributed to the devices of the system 301 in a centralized control configuration. Additionally, the devices of the system 301 may communicate data with one another without having to receive data from a source external to the system 301 and for distribution among the devices. As an example, the devices may include embedded operating modes that cooperatively operate in a distributed control configuration (e.g., peer-to-peer control) to communicate data between the devices.

The system 301 may include a number of OT devices, such as starters 304, starters 308, and a number of other OT devices 310 (including switches, buttons, lights, safety input devices etc.) ending in a terminator 312 monitored by monitoring devices 180. A first monitoring device 180A may be programmed to monitor for expected data communications for a first set of OT devices, such as the starters 304. For example, the first monitoring device 180A may include rules (e.g., defined via a user input) for which types of data communications are expected for the starters 304. For instance, an expected data communication may include instructions compatible with operations of the starters 304, instructions including metadata identifying itself as addressed to the starters 304, instructions including metadata identifying the source of the data communication as a trusted source, among other parameters.

Accordingly, the first monitoring device 180A may inspect packets of data communications from the bridge 302 to determine whether the packets (or other forms of data) are expected for the starters 304. For example, the first monitoring device 180A may compare the data communication with that indicated as expected data communication via the rules. Upon identifying the data communication is expected for the starters 304, the first monitoring device 180A may route the data packets to the starters 304. However, upon identifying unexpected data communication, the monitoring device 180 may perform a variety of actions to block receipt of the unexpected data communication by the starters 304. For example, the first monitoring device 180A may block the unexpected data communication from being transmitted to the starters 304. Additionally, the first monitoring device 180A may store a log that includes receipt of the unexpected data communication, transmit a notification (e.g., to a user device), suspending operation of the starters 304 and/or of other devices (e.g., other OT devices in the system 301), and the like.

In further embodiments, the first monitoring device 180A may block receipt of unexpected data communication associated with the starters 304 and forward the unexpected data communication to a second monitoring device 180B. For example, certain data communication may not be expected (e.g., the data may be incompatible) for the starters 304 but may be expected (e.g., the data may be compatible) for the starters 308. For instance, the starters 308 may be of a different type, implementation, or configuration than the starters 304 and may receive different types of data or data packets. The second monitoring device 180B may receive data packets from the first monitoring device 180A and perform similar monitoring operations for the starters 308 as those performed by the first monitoring device 180A for the starters 304. For this reason, the second monitoring device 180B may also identify unexpected data communication, block receipt of the unexpected data communication by the starters 308, and forward the unexpected data communication to a third monitoring device 180C, which may perform similar monitoring operations for the OT devices 310.

In this manner, each of the monitoring devices 180 may include or utilize a different set of rules that defines the expected data communication associated with the particular OT devices monitored by each monitoring device 180. Indeed, the set of rules used by the first monitoring device 180A may be specific to the starters 304 (e.g., and not the starters 308 or the other OT devices 310), the set of rules used by the second monitoring device 180B may be specific to the starters 308 (e.g., and not the starters 304 or the other OT devices 310), and the set of rules used by the third monitoring device 180C may be specific to the other OT devices 310 (e.g., and not the starters 304, 308). As such, each monitoring device 180 may specifically control data communication associated with a subset of OT devices and may therefore be dedicated to enable desirable operation of the associated subset of OT devices, as well as of components corresponding to the subset of OT devices. Accordingly, a complexity associated with operation of each monitoring device 180 and/or a latency of performing an action via the monitoring device 180 to block undesirable data communications may be reduced as compared to a monitoring device that may monitor data communications associated with numerous OT devices, such as different types of OT devices that may receive substantially different data communications. Indeed, each monitoring device 180 may effectively monitor a particular subset of the OT devices to increase efficient monitoring of OT devices (e.g., as compared to performing HIDS techniques for a single OT device) without overloading or burdening operations, such as to utilize excessive resources, to monitor an excessive number of different OT devices (e.g., in comparison with performing network-based intrusion detection system techniques for all OT devices of an entire network). In other words, each monitoring device 180 may monitor a quantity of OT devices that enables the monitoring device 180 to maintain desirable operation to prevent and/or block unexpected data communication by each monitored OT device. The rules being used by each monitoring device 180 may be particularly selected based on the OT devices associated with the monitoring device 180. Thus, the monitoring device 180 may be adaptive to operate based on a suitable set of rules corresponding to the OT devices being monitored.

In certain embodiments, any of the monitoring devices 180 may control data communication associated with multiple different OT devices, such as OT devices of a particular class, function, or attribute, that may receive similar data communications. By way of example, each of the other OT devices 310 may be pilot devices that may indicate and/or control flow of energy to a corresponding component. Thus, the rules used by the third monitoring device 180C may therefore be associated with whether flow of energy to the corresponding components is enabled and/or blocked, such as based on whether the operation of the component is enabled or suspended. As another example, the second monitoring device 180B may monitor data communication for devices that are particularly used for reducing or mitigating operation of corresponding components. For instance, the second monitoring device 180B may specifically monitor data communication with integrated components (e.g., a contactor) of the starters 308 related to suspending operation of the starters 308. Additionally, the second monitoring device 180B may monitor data communication with external components 314 (e.g., a stop switch or button, a safety input device) that may suspend operation of the starters 308. In this manner, a single monitoring device 180 may monitor devices utilizing common or similar data communication to reduce a quantity of monitoring devices 180 implemented in the system 301. For example, a single set of rules may sufficiently control data communication for different OT devices, and a monitoring device 180 utilizing the single set of rules may therefore be implemented to monitor the different OT devices.

In some embodiments, the respective sets of rules used by each monitoring device 180 (e.g., monitoring substantially different OT devices) may include a common set of rules. By way of example, each monitoring device 180 may include a subset of rules that block receipt of certain data by each of the associated OT devices. Indeed, default rules, which may be applicable to multiple different types of OT devices, and specific rules, which may differ based on the particular type(s) of OT devices, a network parameter or protocol (e.g., common industrial protocol, ProfiNet, IO-Link) utilized for communication via the OT devices, and/or operation of OT devices monitored by the monitoring device 180, may be implemented into each monitoring device 180. For example, a user may pre-program or pre-configure each monitoring device 180 with suitable rules prior to implementing the monitoring device 180 in the system 301. Thus, the monitoring devices 180 may be more customizable based on the group of OT devices to be monitored. Furthermore, the rules for each monitoring device 180 may be adjusted, re-configured, re-programmed, or otherwise updated. In some embodiments, the rules may be manually adjusted, such as via a user input. As an example, a user may adjust the rules to update which data communication is expected. As another example, the user may adjust the rules to cause the monitoring device 180 to monitor data communication associated with a different set of OT devices, such as enable the monitoring device 180 to monitor a different group of OT devices. In additional embodiments, the rules may be automatically adjusted, such as using machine learning techniques that are further described herein. The machine learning techniques may be performed to improve an accuracy in which the data communication is identified as being expected or unexpected.

The diagram 300 is intended to show an example embodiment of an assembly of OT devices monitored by the monitoring devices 180. However, many other embodiments may exist. For example, a backplane or chassis of a device (e.g., a programmable controller) may include many data paths between a number of OT devices, such as modules that may be inserted and/or removed to enable certain operation of the device based on data traffic at the backplane. One or more monitoring devices 180 may be dispersed throughout portions of the backplane to monitor the data packets transmitted between the OT devices specifically at the backplane to enable desirable operation of the device. As another example, a device, such as a drive, may include option cards, which may be selectively implemented in the device to enable different operations of the device. A monitoring device 180 may be positioned within or integrated with the device to inspect communications to and/or from option cards (e.g., between the option cards and core logic or controls of the device).

As another example, in some embodiments, there may be a redundancy system that includes at least a primary and a secondary controller communicatively connected to each other. For example, each of the primary controller and the second controller may cause operation of a common set of devices. In the event that one of the primary controller or the secondary controller is not operating in a desirable fashion (e.g., operation is faulty or suspended), the other of the primary controller or the secondary controller may cause operation of the common set of devices to maintain desirable operations. In such a system, a monitoring device 180 may monitor the data communications between the primary and the secondary controller (e.g., for coordinating operation of the common set of devices), as well as any other data communications in the system, such as between any of the controllers and the common set of devices.

In further embodiments, a device may include a multi-core system, which may include multiple processing units that execute instructions to enable operation of the device. A monitoring device 180 may monitor data communication between separate cores. To this end, the monitoring device 180 may be integrated within the device, such as at an integrated circuit that may include the processing units.

Figure 6:
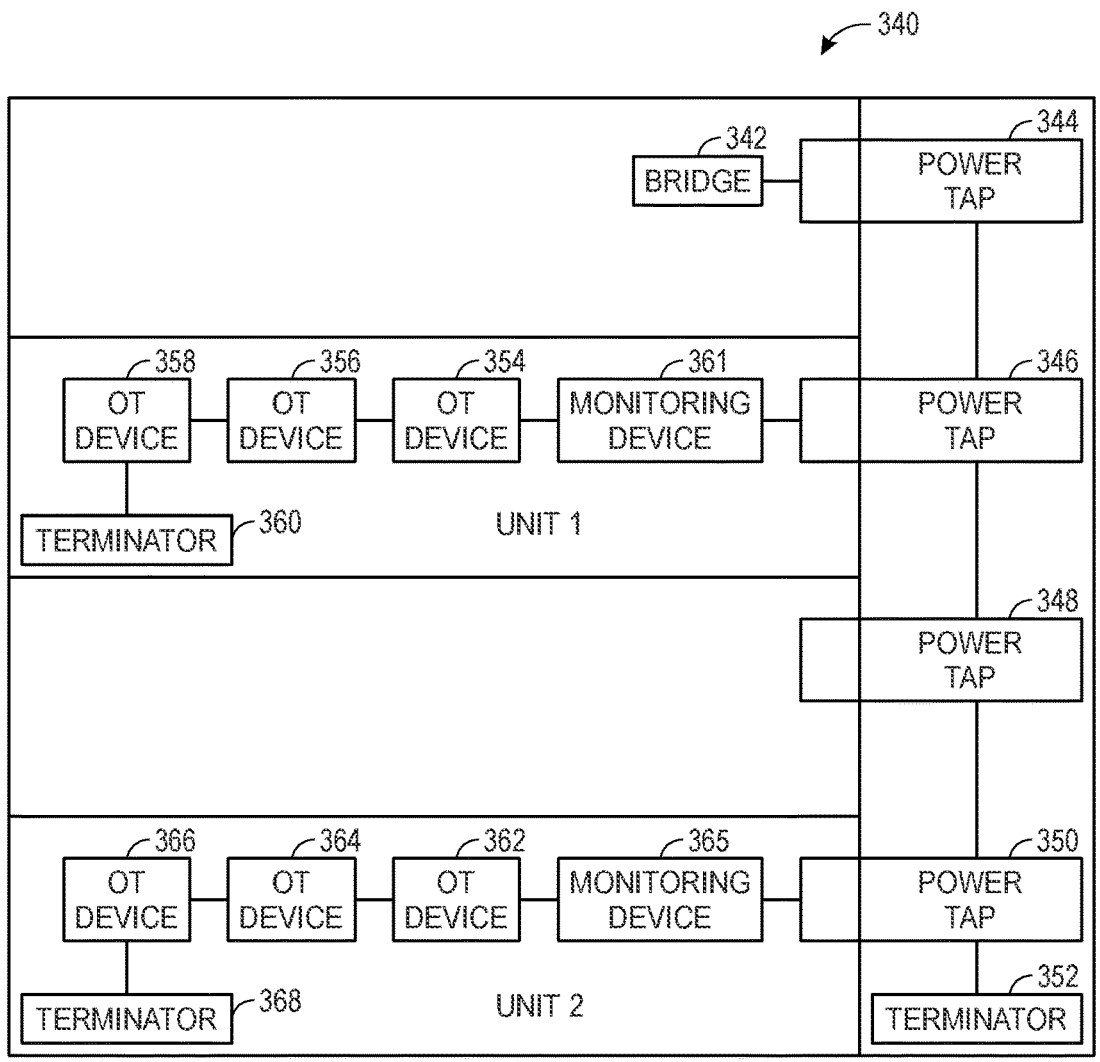
FIG. 6 is a diagram of a system employing the monitoring device of FIG. 3, in accordance with an embodiment.

As previously described, in some embodiments, the monitoring devices 180 may monitor a group of similar OT devices (e.g., OT devices of a common class, function, attribute). FIG. 6 illustrates a diagram of a motor control center (MCC) industrial communication subsystem 340, which may control various components, such as motors, of the industrial automation control system 100. The MCC industrial communication subsystem 340 may include a number of different OT devices that may be arranged into similar groups. For example, the MCC industrial communication subsystem 340 may include a bridge 342 to receive data communication for the MCC industrial communication subsystem 340, such as from a component or device (e.g., a controller) external to the MCC industrial communication subsystem 340. The MCC industrial communication subsystem 340 may further include a number of power taps 344, 346, 348, and 350, and may terminate with a terminator 352. Data may be communicated via a main data connection line (e.g., a wire, a cable), and the power taps 344, 346, 348, 350 may distribute data from the main data connection line 343 to other portions of the MCC industrial communication subsystem 340 and enable operation of various corresponding components of the MCC industrial communication subsystem 340. Indeed, the power taps 344, 346, 348, 350 may automatically recognize the devices of an associated section 345, 347, determine a type of the associated section 345, 347 based on the devices, and program the devices accordingly. For example, the power taps 346 and 350 may enable data flow between the main data connection line 343 and respective sections or buckets 345, 347 of the MCC industrial communication subsystem 340. Each section 345, 347 of the MCC industrial communication subsystem 340 may control a respective operation of the MCC industrial communication subsystem 340, such as of a single motor. In some embodiments, the MCC industrial communication subsystem 340 may include an enclosure, and each section 345, 347 may include a respective portion within the enclosure having a collection of OT devices. The respective OT devices of the sections 345, 347 may be removed from and/or installed into the MCC industrial communication subsystem 340 as a single unit to facilitate implementation, maintenance, replacement, and other adjustments of the MCC industrial communication sub system 340.

A first section 345 may include a first secondary data connection line 349, with OT devices 354, 356, and 358 and a terminator 360 communicatively coupled to the first secondary data connection line 349. The power tap 346 may enable data flow between the first secondary data connection line 349 and the main data connection line 343, such as to enable operation of the OT devices 354, 356, and 358. A first monitoring device 361 may monitor data communication associated with the OT devices 354, 356, and 358, such as between the OT devices 354, 356, and 358 and/or between the main data connection line 343 and the OT devices 354, 356, and 358. The OT devices 354, 356, and 358 may be separate OT devices (e.g., a light, a switch, and a button), but may receive and/or transmit data having similar parameters. For example, the OT devices 354, 356, and 358 may receive data packets from a single source. However, it should be noted that any similarity may be used to group the OT devices 354, 356, and 358. For instance, the OT devices 354, 356, and 358 may be grouped together based on a shared connectivity to an industrial communication subsystem (e.g., the MCC industrial communication subsystem 340), a common zone, a common product class, a common function (e.g., a power switching operation), a common attribute (e.g., download related, contactor control related), or any combination thereof. Accordingly, the monitoring device 361 may monitor data packets communicated from the main data connection line 343 to the first secondary data connection line 349 (e.g., via the power tap 346) to determine whether the data packets that are expected to be received by the OT devices 354, 356, and 358. Additionally, the monitoring device 361 may monitor data packets transmitted from any of the OT devices 354, 356, and 358 to determine whether the transmitted data packets are expected.

Similarly, a second section 347 may include a second secondary data connection line 363, with OT devices 362, 364, and 366, and a terminator 368. The power tap 350 may enable data flow between the second secondary data connection line 351 and the main data connection line 343, such as to enable operation of the OT devices, 362, 364, and 366. A second monitoring device 365 may monitor data communication associated with the OT device 362, 364, and 366, such as between the OT device 362, 364, and 366 and/or between the main data connection line and the OT device 362, 364, and 366. The OT devices 362, 364, and 366 may also be separate OT devices that may communicated data having similar parameters. However, the parameters of data communicated by the OT devices 362, 364, and 366 may be different than that of data communicated by the OT devices 354, 356, and 358. By way of example, the data communicated by the OT devices 362, 364, and 366 may operate a separate motor than that operated by the OT devices 354, 356, and 358. Accordingly, the second monitoring device 365 may perform monitoring and security operations for the OT devices 362, 364, and 366 separate from operation of the first monitoring device 361 to perform monitoring and security operations for the OT devices 354, 356, and 358.

The monitoring devices 361, 365 may, as previously described, perform a number of actions based whether communicated data packets are expected. In some embodiments, the actions to be taken by the monitoring device 361, 365 may be different. Indeed, in some embodiments, the action to be taken may be based on the OT devices monitored by the monitoring device 361, 365. For example, the OT devices 354, 356, and 358 may be of relatively high priority. Thus, after identifying unexpected data communication associated with the first section 345, the first monitoring device 361 may suspend operation of the OT devices 354, 356, and 358 to avoid subsequent operation that may negatively impact the OT devices 354, 356, and 358. However, the OT devices 362, 364, and 366 may be of relatively low priority, and the second monitoring device 365 may maintain operation of the OT devices 362, 364, and 366 after identifying unexpected data communication associated with the second section 347.

Although each of FIGS. 5 and 6 illustrate respective OT devices that are arranged in a linear topology network architecture in which data may sequentially flow through the OT devices, OT devices may additionally be arranged in a star topology network architecture, such as an arrangement in which each OT device may receive data from a source (e.g., a centralized source) in parallel with one another. The monitoring devices may monitor such data communication for a set of the OT devices that are arranged in the star topology network architecture. The monitoring devices may further be implemented to any other suitable topology network architecture, such as a point to point topology network architecture (e.g., IO-link), a bus topology network architecture (e.g., a controller area network based system), a ring topology network architecture, a mesh topology network architecture, a tree topology network architecture, or any combination thereof.

Each of FIGS. 7 and 8 described below illustrated a respective method or process that may be performed by any of the monitoring devices, such as the monitoring device 180, described herein. For example, each method may be performed by the processor 202 of the monitoring device 180, such as based on executing instructions stored on the memory 204. In some embodiments, a single monitoring device 180 may perform different operations for the respective methods. In additional embodiments, separate monitoring devices 180 may perform different operations for a single method and/or may perform the different methods altogether. It should also be noted that additional operations may be performed with respect to the described methods, and/or certain operations of the depicted methods may be removed, modified, and/or performed in a different order. Further still, the operations of any of the respective methods may be performed in parallel with one another, such as at the same time and/or in response to one another. Although the methods described herein are primarily discussed with respect to data communication to be received by an OT device, the methods may be similarly applied to monitoring data communication transmitted by an OT device, such as to another OT device.

Figure 7:
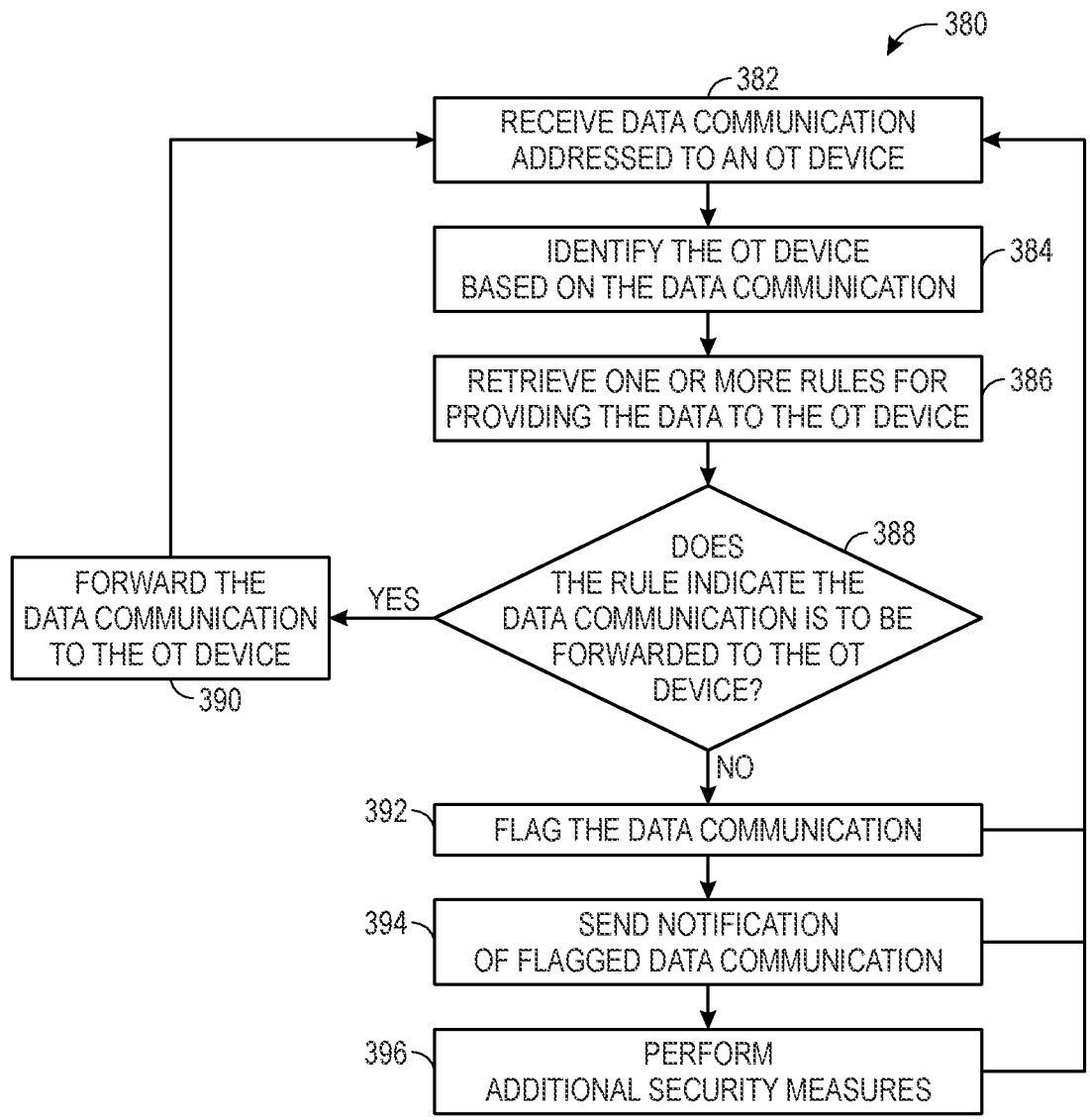
FIG. 7 is a flowchart illustrating example operations of the monitoring device of FIG. 3, in accordance with an embodiment.

FIG. 7 illustrates a method 380 for monitoring data communication associated with an OT device. In some embodiments, the monitoring device 180 may receive (e.g., identify), in a first block 382, data communications (such as data packets) addressed to an OT device. For example, metadata in the data packets may include a designated IP address for the data packet. The data communications may come from a variety of sources, such as the gateway 164, a router, a bridge, another monitoring device 180, or any other source. The monitoring device 180 may then, as in block 384, identify the OT device addressed by the data communication. For example, the monitoring device 180 may determine whether any OT device connected to (e.g., monitored by) the monitoring device 180 has an IP address matching the address information of the data communication. If there is no match, no further action may be performed by the monitoring device 180, and the data communication may be forwarded to another monitoring device 180 or other device connected to the monitoring device 180. For example, the data communication may be addressed an OT device that is not monitored by the monitoring device 180, and the data may therefore be routed for receipt at an intended recipient. As another example, other information, such as a data packet's application layer information, may be used to determine an OT device to which the data may be transmitted.

In response to identifying the OT device based on the data communication, the monitoring device 180 may, as in block 386, retrieve one or more rules for providing the data communication to the identified OT devices. For example, different sets of rules for different OT devices may be stored on the monitoring device 180 (e.g., based on a user input or user programming). Each set of rules may be associated with a particular type of OT device, such as a zone, a class, a function, an attribute, and so forth. As such, the monitoring device 180 may determine a type of the identified OT device and retrieve the particular set of rules associated with the type of the identified OT device. In some embodiments, the monitoring device 180 may query the type of the identified OT device. For example, the monitoring device 180 may communicate with a database or reference other information that may associate various OT devices (e.g., identifiers of OT devices) with corresponding types, and the monitoring device 180 may determine the type of the identified OT device accordingly. In any case, as previously described, the rules may indicate the data communication received by the monitoring device in block 382 is expected.

After the rules are retrieved, the monitoring device 180 may, as illustrated in block 388, determine whether the retrieved rules indicate the data communication is to be forwarded to the OT device. In response to determining that the rules indicate the data communication is to be forwarded to the OT device (e.g., the data communication is expected), then the monitoring device 180 may proceed to a block 390, wherein the monitoring device 180 may forward the data communication to the OT device. For example, the monitoring device 180 may identify a rule associated with the received data communication, determine that the rule indicates the data communication is to be forwarded to the OT device, and forward the data communication to the OT device. As such, the OT device may operate based on the forwarded data communication, such as by controlling operation of a corresponding component or device. The monitoring device 180 may then resume operations of receiving or otherwise monitoring incoming data communications, for example by returning to the block 382.

In response to determining that the rules do not indicate the data communication is to be forwarded to the OT device (e.g., the data communication is unexpected, the data is incompatible with the OT device), the monitoring device 180 may perform operations that prevent or block receipt of the data communication by the OT device. In some embodiments, the monitoring device 180 may identify a rule associated with the received data communication and determine that the rule indicates the data communication is not to be forwarded to the OT device. Additionally, the monitoring device 180 may not identify a rule associated with the received data communication and may therefore determine that no existing rule indicates the data is to be forwarded to the OT device. As a result, for example, in the block 392, the monitoring device 180 may flag the data communication, such as to add an indicator in a log that the data communication is not expected.

The monitoring device 180 may further perform the block 394 of sending a notification of the flagged data communication. For example, the monitoring device 180 may, via the communication circuitry 208, send a push notification to a personal electronic device of an operator of the industrial automation system 100, instruct an alarm to go off, or otherwise provide a notification of the data communication. The notification may be sent immediately upon flagging the data communication and/or as part of a routine reporting schedule. For example, the monitoring device 180 may send an hourly, daily, or weekly notification that includes all flagged data communications. Additionally, in some embodiments, the monitoring device 180 may perform the block 396, which may include performing any additional security measures or operations. For example, as previously described, the monitoring device 180 may suspend operation of certain devices (e.g., the OT device) of the industrial automation system 100. It should be noted that the monitoring device 180 may select a particular operation to prevent or block receipt of the data communication by the OT device based on a property of the OT device, such as the type of the OT device. By way of example, the retrieved rules associated with the OT device may indicate a particular operation to be performed, and the monitoring device 180 may perform the indicated operation. Further, upon completion of any of the blocks 392, 394, or 396, the monitoring device may resume operations of retrieving data communications, as in the block 382.

The monitoring device 180 may, in some embodiments, employ machine-learning techniques (e.g., supervised machine learning, unsupervised machine learning) to generate, adjust, improve, or otherwise update rules used to monitor data communication associated with OT devices. As used herein, machine learning refers to algorithms and statistical models that the monitoring device 180 may use to perform a specific task without using explicit instructions, relying instead on patterns and inference. In particular, machine learning generates a mathematical model based on data (e.g., sample or training data, historical data) in order to make predictions or decisions without being explicitly programmed to perform the task. Thus, as subsequent data communication is monitored, the patterns indicative of whether the communication is expected and better reflect when the data communication is to be forwarded to the OT device. The monitoring device 180 may therefore refer to the patterns to more accurately determine whether data communication is to be forwarded to the OT device. For example, the monitoring device 180 may block unexpected data communication more accurately (e.g., with fewer instances in which the OT device received unexpected data communication that may affect operation of the OT device).

In some embodiments, such as when particular known examples exist that correlate to future predictions that the monitoring device 180 will be tasked with generating, supervised machine learning may be implemented. In supervised machine learning, the mathematical model of a set of data contains both the inputs and the desired outputs. This data is referred to as "training data" and is essentially a set of training examples. Each training example has one or more inputs and the desired output, also known as a supervisory signal. In the mathematical model, each training example is represented by an array or vector, sometimes called a feature vector, and the training data is represented by a matrix. Through iterative update of an objective function, supervised learning algorithms learn a function that can be used to predict the output associated with new inputs. An updated function may allow the algorithm to correctly determine the output for inputs that were not a part of the training data. An algorithm that improves the accuracy of its outputs or predictions over time is said to have learned to perform that task. Supervised learning algorithms include classification and regression. Classification algorithms are used when the outputs are restricted to a limited set of values, and regression algorithms are used when the outputs may have any numerical value within a range. Further, similarity learning is an area of supervised machine learning closely related to regression and classification, but the goal is to learn from examples using a similarity function that determines the extent in which two objects are similar or related.

Additionally, in some situations, it may be beneficial for the monitoring device 180 to utilize unsupervised learning (e.g., when particular output types are not known). Unsupervised learning algorithms take a set of data that contains only inputs, and find structure in the data, such as grouping or clustering of data points. The algorithms, therefore, learn from test data that has not been labeled, classified, or categorized. Instead of responding to feedback, unsupervised learning algorithms identify commonalities in the data and react based on the presence or absence of such commonalities in each new piece of data.

Figure 8:
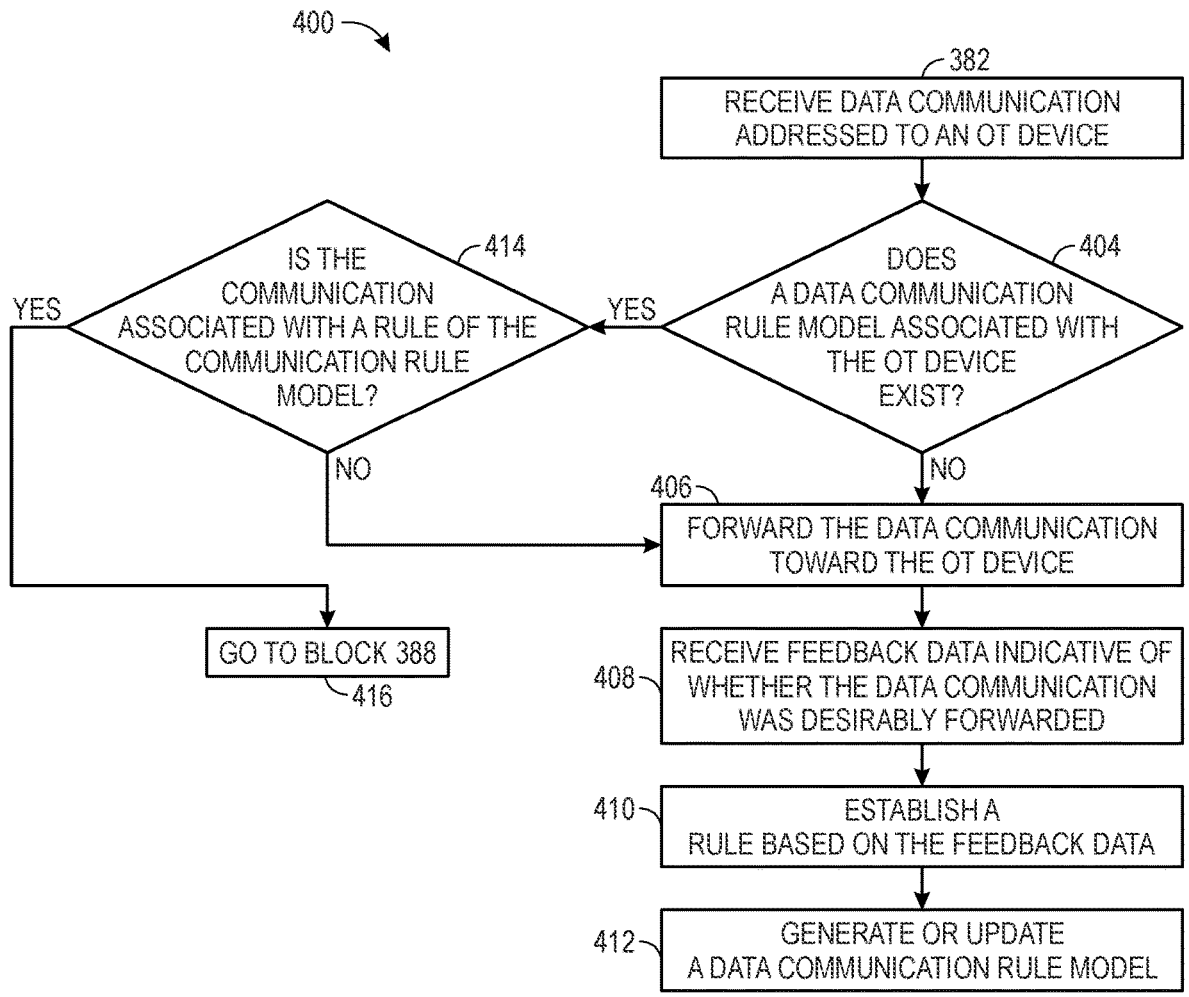
FIG. 8 is a flowchart illustrating example operations of the monitoring device of FIG. 3, in accordance with an embodiment, in accordance with an embodiment.

FIG. 8 illustrates a method 400 for monitoring data communication associated with an OT device using a machine-learning technique. In the method 400, the monitoring device 180 may, as in block 382, receive or identify a data communication addressed to an OT device using any of the techniques described above. The monitoring device 180 may then determine, as in block 404, whether a data communication rule model associated with the OT device exists. For example, the monitoring device 180 may identify a type of the OT device (e.g., based on the data communication) and determine whether the monitoring device 180 includes any stored rules (e.g., as defined by a user) that are associated with the OT device. Further, the monitoring device 180 may communicate with or query other monitoring devices to determine whether the other monitoring devices may utilize a data communication rule model for monitoring data for similar OT devices. In response to determining that a data communication rule model associated with the OT device does not exist or is absent/unavailable, the monitoring device 180 may, as in block 406, forward the data communication to the OT device to enable the OT device to operate based on the data communication (e.g., adjust operation of a corresponding component, emit a light, change a temperature setting, etc.).

The monitoring device 180 may then, as in block 408, receive feedback data indicative of whether the data communication was desirably forwarded. For example, in some embodiments, the OT device may be monitored by an additional monitoring device operating in parallel (e.g., performing the methods 380, 400) with the monitoring device 180. The OT device may receive the data communication forwarded to the OT device via the monitoring device 180. The additional monitoring device may include rules indicative of data communication associated with the OT device and may determine whether the data communication is to be forwarded to the OT device based on the rules. As an example, in response to determining that the rules do not indicate the data communication is to be forwarded to the OT device (e.g., the data is incompatible with the OT device), the additional monitoring device may transmit feedback data to the monitoring device 180 to indicate that the data communication was not desirably forwarded to the OT device. As another example, in response to determining that the rules indicate the data communication is to be forwarded to the OT device, the additional monitoring device may transmit feedback data to the monitoring device 180 to indicate that the data communication was desirably forwarded to the OT device. In additional embodiments, the additional monitoring device may determine whether operation of the OT device as a result of receipt of the data communication is desirable or expected. In response to determining that the operation of the OT device is not desirable or expected, thereby indicating the data is incompatible with the OT device, the additional monitoring device may transmit feedback data to the monitoring device 180 to indicate that the data communication was not desirably forwarded to the OT device. In response to determining that the operation of the OT device is desirable or expected (e.g., the data is compatible with the OT device), the additional monitoring device may transmit feedback data to the monitoring device 180 to indicate that the data communication was desirably forwarded to the OT device.

Upon receiving the feedback data, the monitoring device may, as in block 410, generate a rule based on the feedback data. For example, the monitoring device 180 may determine that the data communication was not to be forwarded to the OT device and establish a rule that indicates similar data communication is not to be forwarded to the OT device. For instance, the monitoring device 180 may determine metadata associated with the undesirably forwarded data communication. For example, the metadata may include information indicating the time that the data communication was transmitted. Other examples of metadata include confirmation data that the data communication was transmitted in accordance with a specific protocol, an indication of the source of the data communication (e.g., to confirm that the source is a trusted or known source), a designated IP address for the data communication, or any other information. Furthermore, the monitoring device may establish a rule that indicates certain subsequent data communication having common metadata is not to be forwarded to the OT device. However, in response to determining that the data communication was to be forwarded to the OT device, the monitoring device 180 may establish a rule that indicates similar data communication (e.g., having common metadata) is to be forwarded to the OT device. The monitoring device 180 may therefore, as in block 412, generate or update a communication rule model for the OT device based on the established rule.

However, returning to block 404, in response to determining that a data communication rule model exists, the monitoring device 180 may determine, as in block 414, whether the data communication is associated with a rule of the data communication rule model. In response to determining that the data communication is not associated with any rule of the data communication rule model, then the monitoring device 180 may operate the block 406 as previously described to generate or update a rule of the data communication rule model. Alternatively, in response to determining that the data communication is associated with a rule of the data communication rule model, the monitoring device 180 may perform the operation of the block 388 described in FIG. 7. Specifically, the monitoring device 180 may determine whether the rule indicates the data communication is to be forwarded to the OT device and operate accordingly to enable or block forwarding of the data to the OT device, as described in FIG. 7. As an example, certain information, such as a data packet's application layer information, may be used by the monitoring device 180 to determine whether the data packet is compatible for a recipient OT device based on the rule.

The monitoring device 180 may also adjust, remove, or otherwise update an existing rule based on the disclosed machine learning techniques. For example, the monitoring device 180 may forward data communication to an OT device based on a retrieved rule (e.g., from an existing data communication rule model). However, upon forwarding the data communication to the OT device, the monitoring device 180 may receive feedback data indicate that the data communication was undesirably forwarded to the monitoring device 180, such as based on operation of the monitoring device 180 and/or based on an existing rule indicating the data communication is not to be forwarded to the monitoring device 180. As a result, the monitoring device 180 may update the retrieved rule to block forwarding of subsequent, similar data communication to the OT device.

The operations of the monitoring device 180 disclosed in the FIGS. 7 and 8 may be repeatedly and independently performed for any number of OT devices. For example, as described previously, the monitoring device 180 may monitor a group of OT devices, which may be of the same type and may therefore be associated with common data communications. Accordingly, the rules that apply to one OT device of the group may similarly apply to the other OT devices of the same group.

Furthermore, although the methods 380, 400 are primarily directed to operation of the monitoring device 180 to prevent receipt of unexpected or incompatible data by the OT device, the monitoring device 180 may similarly operate to block effects of incompatible data already received by the OT device. For example, the monitoring device 180 may identify (e.g., poll, intercept, inspect) data that has already been received by the OT device and determine whether such data is expected or compatible, such as by confirming that the data was to be received by the OT device based on a data communication rule model. In response to determining that the data was not to be received by the OT device, the monitoring device 180 may perform an additional action (e.g., flagging the data communication, sending a notification of the data communication, adjusting an operation of the OT device) to block the received data from undesirably impacting operation of the industrial automation system. The monitoring device 180 may also adjust the data communication rule model based on feedback indicative of whether data was correctly or incorrectly identified as being unexpected or incompatible.

While the present disclosure may be susceptible to various modifications and alternative forms, specific embodiments have been shown by way of example in the drawings and have been described in detail herein. However, it should be understood that the present disclosure is not intended to be limited to the particular forms disclosed. Rather, the present disclosure is intended to cover all modifications, equivalents, and alternatives falling within the spirit and scope of the present disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An industrial automation system, comprising:
   an operational technology (OT) industrial automation device configured to perform a first operation for the industrial automation system, wherein the OT industrial automation device is configured to receive a first set of data comprising a first set of instructions related to the first operation; and
   a monitoring device configured to:
   identify the first set of data;
   identify the OT industrial automation device based on the first set of data;
   retrieve one or more rules for providing communications to the OT industrial automation device in response to identifying the OT industrial automation device;
   forward the first set of data to the OT industrial automation device in response to determining that the one or more rules correspond to the first set of data being forwarded to the OT industrial automation device; and prevent the first set data from being forwarded to the OT industrial automation device in response to determining that the one or more rules correspond to the first set of data being incompatible with the OT industrial automation device; and send a notification to a mobile device communicatively coupled to the monitoring device in response to determining that the one or more rules correspond to the first set of data being incompatible with the OT industrial automation device.

2. The industrial automation system of claim 1, comprising a second OT industrial automation device configured to perform a second operation for the industrial automation system, the second OT industrial automation device is configured to receive a second set of data comprising a second set of additional instructions related to the second operation, the OT industrial automation device and the second OT industrial automation correspond to a first group of OT industrial automation devices, and the monitoring device is configured to:

identify the second set of data; and selectively forward the second set of data to the second OT industrial automation device based on the one or more rules.

3. The industrial automation system of claim 2, wherein the first group is associated with a zone, a product class, a function, an attribute, or any combination thereof.

4. The industrial automation system of claim 2, comprising:

a third OT industrial automation device part of a second group of OT industrial automation devices different from the first group, the third OT industrial automation device is configured to perform a third operation, and the third OT industrial automation device is configured to receive a third set of data comprising a third set of instructions related to the third operation; and a second monitoring device configured to:

identify the third set of data;

identify the third OT industrial automation device based on the third set of data;

retrieve one or more additional rules for providing communications to the third OT industrial automation device in response to identifying the third OT industrial automation device; and selectively forward the third set of data to the third OT industrial automation device based on the one or more additional rules.

5. The industrial automation system of claim 1, wherein the monitoring device is configured to suspend operation of the OT industrial automation device in response to determining that the one or more rules being incompatible with the OT industrial automation device.

6. The industrial automation system of claim 2, wherein the first group corresponds to an industrial communication subsystem of the industrial automation system.

7. The industrial automation system of claim 6, wherein the monitoring device is communicatively connected to a gateway configured to route the first set of data to the industrial communication subsystem of the industrial automation system.

8. A non-transitory, computer-readable medium, comprising instructions that, when executed by one or more processors of an industrial automation component, cause the one or more processors to perform operations comprising:

receiving a first set of data comprising a first set of instructions related to a first operation for an operational technology (OT) industrial automation device;

identifying the OT industrial automation device based on the first set of data;

retrieving one or more rules for providing communications to the OT industrial automation device in response to identifying the OT industrial automation device;

determining that the one or more rules are unavailable;

in response to determining that the one or more rules are unavailable:

forwarding the first set of data to the OT industrial automation device;

receiving feedback data indicative that the first set of data is to be blocked from being forwarded to the OT industrial automation device after forwarding the first set of data to the OT industrial automation device; and generating the one or more rules for the OT industrial automation device based on the feedback data to indicate that the first set of data is incompatible with the OT industrial automation device.

9. The non-transitory, computer-readable medium of claim 8, wherein the one or more processors perform operations comprising receiving a second set of data comprising a second set of instructions related to a second operation for the OT industrial automation device;

identifying the OT industrial automation device based on the second set of data;

retrieving the one or more rules generated based on the feedback data; and blocking forwarding of the second set of data to the OT industrial automation device based on the one or more rules.

10. The non-transitory, computer-readable medium of claim 8, wherein the one or more processors perform operations comprising:

forwarding the first set of data in response to determining that the one or more rules correspond to the first set of data being forwarded to the OT industrial automation device; and preventing the first set data from being forwarded to the OT industrial automation device in response to determining that the one or more rules correspond to the first set of data being incompatible with the OT industrial automation device.

11. The non-transitory, computer-readable medium of claim 8, wherein the one or more processors perform operations comprising:

determining whether a communication rule model exists for the OT industrial automation device in response to identifying the OT industrial automation device; and in response to determining that the communication rule model exists, retrieving the one or more rules from the communication rule model.

12. The non-transitory, computer-readable medium of claim 8, wherein the one or more processors perform operations comprising:

forwarding the data to the OT industrial automation device based on the one or more rules;

receiving feedback data indicative that the data is to be blocked from forwarding to the OT industrial automation device after forwarding the data to the OT industrial automation device; and adjusting the one or more rules based on the feedback data.

13. A method, comprising:
receiving, via a monitoring device of an industrial automation system, a data packet addressed to an operational technology (OT) industrial automation device of the industrial automation system;
determining, via the monitoring device, that the OT industrial automation device corresponds to one of a plurality of OT industrial automation devices;
in response to determining that the OT industrial automation device corresponds to the one of the plurality of OT industrial automation devices, determining, via the monitoring device, a rule associated with providing data to the one of the plurality of OT industrial automation devices;
forwarding, via the monitoring device, the data packet to the OT industrial automation device in response to determining that the rule corresponds to the data being forwarded to the one of the plurality of OT industrial automation devices; and
suspending, via the monitoring device, operation of the OT industrial automation device in response to determining that the rule is indicative of the data being incompatible with the one of the plurality of OT industrial automation devices.

14. The method of claim 13, comprising retrieving, via the monitoring device, a set of rules from a data communication rule model based on the one of the plurality of OT industrial automation devices, wherein the data communication rule model is associated with providing data to the plurality of OT industrial automation devices.

15. The method of claim 14, wherein the set of rules comprises the rule associated with providing data to the one of the plurality of OT industrial automation devices, and the method comprises determining, via the monitoring device, the rule from the set of rules based on the rule being associated with the data packet to determine the rule associated with providing data to the one of the plurality of OT industrial automation devices.

16. The method of claim 13, wherein the plurality of OT industrial automation devices monitored by the monitoring device comprises a primary controller, the one of the plurality of OT industrial automation devices comprises a secondary controller, and the method comprises selectively forwarding, via the monitoring device the data packet from the primary controller to the secondary controller based on the rule.

17. The method of claim 13, wherein the one of the plurality of OT industrial automation devices comprises a backplane system, and the method comprises selectively forwarding, via the monitoring device, the data packet to the backplane system based on the rule.

* * * * *